United States Patent Office 3,637,850
Patented Jan. 25, 1972

3,637,850
SUBSTITUTED BENZYLIDENEAMINO
GUANIDINES
William J. Houlihan and Robert E. Manning, Mountain Lakes, N.J., assignors to Sandoz-Wander, Inc., Hanover, N.J.
No Drawing. Filed Apr. 4, 1969, Ser. No. 813,719
The portion of the term of the patent subsequent to July 6, 1988, has been disclaimed
Int. Cl. C07c 133/10
U.S. Cl. 260—564 F    2 Claims

ABSTRACT OF THE DISCLOSURE

Substituted benzylideneamino - 3 - hydroxy guanidines, e.g., 1-(m-trifluoromethylbenzylideneamino)-3 - hydroxyguanidine hydrochloride, are useful as hypoglycemics-antihyperglycemics.

---

This invention relates to benzylideneamino guanidines, acid addition salts thereof, and to methods for their preparation. The substituted benzylideneamino guanidines of this invention may be represented by the following structural formula:

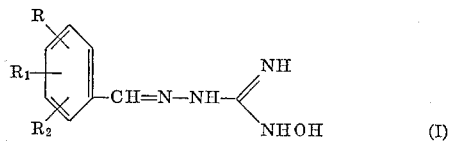

where each of R, $R_1$ and $R_2$ represents hydrogen, halo having an atomic weight of about 19–36, alkyl having from 1 to 4 carbon atoms, alkoxy having from 1 to 4 carbon atoms or trifluoromethyl; provided (1) when one of R, $R_1$ and $R_2$ is hydrogen the others are other than halo or 2,6-dimethyl;
(2) when two of R, $R_1$ and $R_2$ are hydrogen, the other is not halo; and
(3) when at least two of R, $R_1$ and $R_2$ are trifluoromethyl, they are not ortho to one another.

The compounds of Formula I may be prepared by treating in solvent an aldehyde of the formula:

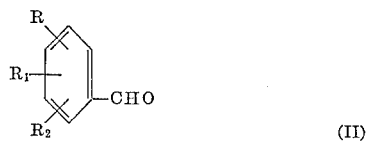

wherein R, $R_1$ and $R_2$ are as defined above, with 1-amino-3-hydroxy-guanidine (III).

In accordance with the above process, the compounds of Formula I are prepared by treating the aldehydes of Formula II with 1-amino-3-hydroxyguanidine (III) or an acid addition salt thereof in lower alkanol solvent, e.g., methanol, ethanol or isopropanol. The reaction may be conducted at a temperature of from about 20–70° C., preferably 25–45° C. The resulting product (I) is recovered by conventional techniques such as recrystallization and filtration.

When an acid addition salt of 1-amino-3-hydroxy-guanidine is utilized, the resulting product (I) is obtained as the corresponding acid addition salt. Such salt may be converted to the free base by conventional techniques. When an acid addition salt of the compound of Formula I is desired, it may be obtained by salifying the free base.

Certain of the aldehydes of Formula II are known and may be prepared according to methods disclosed in the literature. Those other aldehydes (II) not specifically disclosed may be prepared by analogous methods from known materials.

The 1-amino-3-hydroxyguanidine (III) is prepared by treating in solvent and in the presence of base an acid addition salt of an S-lower alkyl or S-benzylisothiosemicarbazide (IV), preferably S-methylisothiosemicarbazide, with an acid addition salt (e.g., hydrohalide) of hydroxylamine. The acid addition salts of (IV) useful according to this procedure include strong mineral acid addition salts such as the hydrohalide salts, e.g., the hydrochloride salts and the hydroiodide salts, the lower alkyl sulfate salts such as the methyl sulfate salts, and the like. Alkali and alkaline earth metal hydroxides, preferably sodium hydroxide and potassium hydroxide are useful as the base present. About 1 molar equivalent of the base should be used to obtain good conversion to the 1-amino-3-hydroxyguanidine (III). The reaction is conducted at a temperature of about 20°–60° C., preferably about 25°–35° C. It is performed in aqueous solvent such as water either alone or in admixture with lower alkanol such as ethanol and isopropanol, and the like. The guanidine (III) may be recovered according to conventional techniques and converted to acid addition salts such as those mentioned above by salification.

The compounds of Formula I may alternatively be prepared by treating a substituted benzaldehyde S-lower alkylisothiosemicarbazone (V) with hydroxylamine (the latter preferably as an acid addition salt, e.g., a hydrohalide such as the hydrochloride). The reaction may be represented as follows:

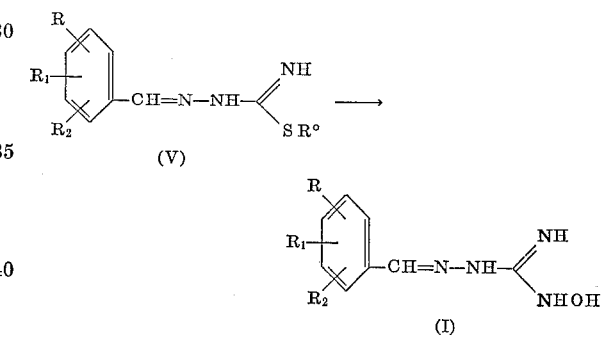

wherein R, $R_1$ and $R_2$ are as previously defined and R° represents lower alkyl, i.e., alkyl having 1–4 carbon atoms such as methyl, ethyl, isopropyl and the like.

The isothiosemicarbazone (V) is treated with the hydroxylamine in a solvent which dissolves both reactants, such as water in admixture with a lower alkanol, e.g., methanol or ethanol, or a tetrahydrofuran-water mixture, and the like. The reaction may be carried out at a temperature of about 10° C. to reflux temperature, preferably at about 20° C.–50° C. The particular solvent and temperature used is not critical in obtaining the compounds (I). In a manner similar to that earlier described respecting the process for preparing the compounds (I), use of an acid addition salt of hydroxylamine provides a corresponding salt of the benzylideneamino guanidine (I).

The S-lower alkylisothiosemicarbazones (V) are prepared by treating a substituted benzaldehydethiosemicarbazone of the formula:

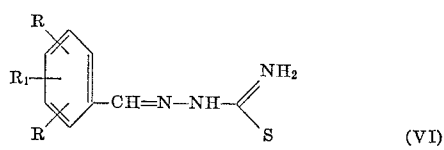

wherein R, $R_1$ and $R_2$ are as earlier defined, in solvent with a loweralkyl halide, preferably the bromide or iodide, such as methyl iodide, methyl bromide, ethyl iodide and the like. This reaction may be conducted in solvent such as methylene chloride, tetrahydrofuran, benzene, alcohols, e.g., lower alkanols such as methanol, ethanol and isopropanol, mixtures thereof, and the like, from about room temperature to the reflux temperature of the system, preferably 50° C.–80° C. Neither the particular solvent nor the reaction temperature is critical. The intermediate (VI) is recovered by conventional techniques as the acid addition salt, e.g., the hydroiodide.

Said salt is converted to the free base (VI) by treatment with sodium carbonate in solvent capable of dissolving the reactants such as water or a water-lower alkanol mixture at a temperature of from about 0° to about 50° C., conveniently about room temperature. These temperatures are not, however, critical in obtaining the free base.

Some of the compounds (VI) are known and are prepared according to methods disclosed in the literature. Those of the compounds of Formula VI not specifically disclosed may be prepared by treating an appropriately substituted dihalobenzaldehyde with thiosemicarbazide in solvent such as ethanol at reflux temperature.

Similarly, certain of the isothiosemicarbazones (IV) are known compounds and may be prepared by methods disclosed in the literature. Those isothiosemicarbazones not specifically disclosed in the literature may be prepared by analogous methods from known materials.

The compound of Formula I may also be represented by their tautomeric equivalents as indicated by Formulas VII and VIII:

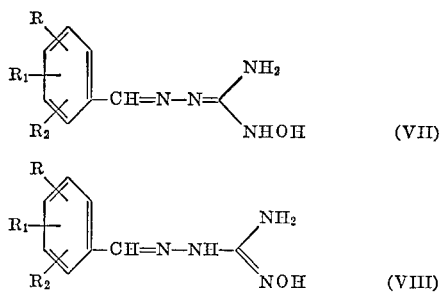

Such equivalents are intended to be within the scope of the present invention, but reference is made herein to the compound (I) for convenience.

The compounds represented by Formula I above are useful because they possess pharmacological activity in animals. In particular, these compounds are useful as hypoglycemics-antihyperglycemics, as indicated by their activity in chickens given 10 mg./kg. orally of active material and thereafter dosed orally with glucose and the results compared with those obtained with chickens given placebo and glucose alone. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds (I) may be similarly administered in the form of their non-toxic pharmaceutically acceptable acid addition salts, i.e., salts of a pharmaceutically acceptable acid. Such salts possess the same order to activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluene-sulfonate, benzenesulfonate and the like.

In general, satisfactory results are obtained when these compounds are administered at a daily dosage of about 0.1 milligram to about 40 milligrams per kilogram of animal body weight. This daily dosage is preferably administered 2 to 4 times a day, or insustained release form. For most large mammals such as primates, the total daily dosage is from about 4 milligrams to about 25 milligrams. Dosage forms suitable for internal use comprise from about 1 milligram to about 12.5 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by wt. |
| --- | --- |
| 1-(m - trifluoromethylbenzylideneamino)-3-hydroxyquanidine hydrochloride | 20 |
| Tragacanth | 2 |
| Lactose | 69.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

1-(m-trifluoromethylbenzylideneamino)-3-hydroxyguanidine hydrochloride

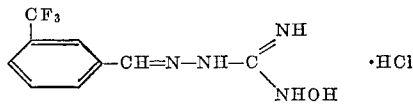

Step A: Preparation of m-trifluoromethylbenzaldehyde thiosemicarbazone.—A mixture of m-trifluoromethylbenzaldehyde (36.0 g.), thiosemicarbazide (18.0 g.) and ethanol (400 ml.) is heated under reflux with stirring for 2 hours. The reaction mixture is cooled and m-trifluoromethylbenzaldehyde thiosemicarbazone is collected by filtration.

Step B: Preparation of m-trifluoromethylbenzaldehyde methylisothiosemicarbazone hydroiodide.—A mixture of m-trifluoromethylbenzaldehyde thiosemicarbazone (24.7 g.), methyliodide (20 g.), and ethanol (500 ml.) is heated under reflux with sitrring for 3 hours. The reaction mixture is cooled and the product collected by filtration to afford m-trifluoromethylbenzaldehyde methylisothiosemicarbazone hydroiodide.

Step C: Preparation of m-trifluoromethylbenzaldehyde methylisothiosemicarbazone.—A mixture of m-trifluoromethylbenzaldehyde methylisothiosemicarbazone hydroiodide (36 g.) and 2 N sodium carbonate solution (1000 ml.) is stirred for 1 hour. The resultant solid is collected by filtration and washed with 800 ml. water to provide m-trifluoromethylbenzaldehyde methylisothiosemicarbazone.

Step D: Preparation of 1-(m-trifluoromethylbenzylidineamino)-3-hydroxyquanidine hydrochloride.—m-Trifluoromethylbenzaldehyde methylisothiosemicarbazone (26 g.) is added to a solution of hydroxylamine hydrochloride (9.0 g.) in water (15 ml.) and ethanol (100 ml.) and stirred for 18 hours. The clear solution is evaporated in vacuo and the residue taken up in a mixture of 150 ml. of water, 20 ml. 2 N hydrochloric acid and 150 ml. ether. The aqueous phase is separated and made basic with 20 ml. of concentrated ammonium hydroxide. After stirring for ½ hour, the resultant solid is collected by filtration, washed with water, and dried to afford the free base, which is suspended in methanol (80 ml.) and treated with hydrogen chloride gas to form the salt. The resultant solution is evaporated in vacuo to give the crude salt.

EXAMPLE 2

Following the procedure of Step B of Example 1 and employing an equivalent amount of the following carbazone in place of the carbazone used therein there are obtained the products enumerated below:

| Carbazone | Product |
|---|---|
| (1) Benzaldehyde thiosemicarbazone. | Benzaldehyde methylisothiosemicarbazone hydroiodide. |
| (2) p-Methylbenzaldehyde thiosemicarbazone. | p-Methylbenzaldehyde methylisothiosemicarbazone hydroiodide. |
| (3) 2,6-dimethoxybenzaldehyde thiosemicarbazone. | 2,6-dimethoxybenzaldehyde methylisothiosemicarbazone hydroiodide. |
| (4) 2,4,6-trichlorobenzaldehyde thiosemicarbazone. | 2,4,6-trichlorobenzaldehyde methylisothiosemicarbazone hydroiodide. |
| (5) p-Methoxybenzaldehydethiosemicarbazone. | p-Methoxybenzaldehyde methylisothiosemicarbazone hydroiodide. |
| (6) 2,4,6-trimethylbenzaldehyde thiosemicarbazone. | 2,4,6-trimethylbenzaldehyde methylisothiosemicarbazone hydroiodide. |

EXAMPLE 3

Following the procedure of Step C of Example 1 and employing an equivalent amount of the product of Example 2 in place of isothiosemicarbazone used therein there are obtained, respectively, the following products:

(1) Benzaldehyde methylisothiosemicarbazone
(2) p-Methylbenzaldehyde methylisothiosemicarbazone
(3) 2,6-dimethoxybenzaldehyde methylisothiosemicarbazone
(4) 2,4,6-trichlorobenzaldehyde methylisothiosemicarbazone
(5) p-methoxybenzaldehyde methylisothiosemicarbazone
(6) 2,4,6-trimethylbenzaldehyde methylisothiosemicarbazone

EXAMPLE 4

Following the procedure of Step D of Example 1 and employing an equivalent amount of the free bases obtained in Example 2, there are obtained, respectively, the salts enumerated below:

(1) 1-benzylideneamino-3-hydroxyguanidine hydrochloride
(2) 1-(p-methylbenzylideneamino)-3-hydroxyguanidine hydrochloride
(3) 1-(2,6-dimethoxybenzylideneamino)-3-hydroxyguanidine hydrochloride
(4) 1,(2,6-trichlorobenzylideneamino)-3-hydroxyguanidine hydrochloride
(5) 1-(p-methoxybenzylideneamino)-3-hydroxyguanidine hydrochloride
(6) 1,(2,4,6-trimethylbenzylideneamino)-3-hydroxyguanidine hydrochloride

What is claimed is:
1. A compound of the formula:

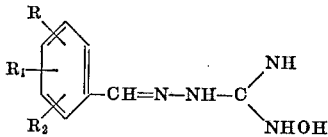

wherein each of R, $R_1$ and $R_2$ represent hydrogen, halo having an atomic weight of from 19 to 36, alkyl having from 1 to 4 carbon atoms, alkoxy having from 1 to 4 carbon atoms or trifluoromethyl; provided that (1) when one of R, $R_1$ and $R_2$ is hydrogen the others are other than halo or 2,6-dimethyl;
(2) when two of R, $R_1$ and $R_2$ are hydrogen, the others are not halo; and
(3) when at least two of R, $R_1$ and $R_2$ are tirfluoromethyl, they are not ortho to each other.

2. An acid addition salt of a compound of claim 1 derived from a pharmaceutically acceptable acid.

References Cited
UNITED STATES PATENTS
3,130,232 4/1964 Paquette _____ 260—564
3,349,099 10/1967 Marxer _____ 260—326.14

FOREIGN PATENTS
958,832 2/1957 Germany _____ 260—564

OTHER REFERENCES
Yale, Journal of Medicinal and Pharmaceutical Chemistry, Vol. 1, No. 2 pp. 121–133 (1959).

LEON ZITVER, Primary Examiner
G. E. SCHWARTZ, Assistant Examiner

U.S. Cl. X.R.
260—501.14, 552 R, 564 E; 424—326